(12) United States Patent
Kitayama et al.

(10) Patent No.: US 8,328,270 B2
(45) Date of Patent: Dec. 11, 2012

(54) INTEGRATED ROLLER AND STRIKER ASSEMBLY FOR A VEHICLE

(75) Inventors: Kenichi Kitayama, Tochigi (JP); Matthew Weyand Schmitt, Dublin, OH (US); Michael A. Schrader, Allston, MA (US)

(73) Assignee: Honda Motor Co., Ltd., Tokyo (JP)

( * ) Notice: Subject to any disclaimer, the term of this patent is extended or adjusted under 35 U.S.C. 154(b) by 198 days.

(21) Appl. No.: 12/962,364

(22) Filed: Dec. 7, 2010

(65) Prior Publication Data
US 2012/0139287 A1 Jun. 7, 2012

(51) Int. Cl.
*B60J 5/06* (2006.01)
(52) U.S. Cl. ...................... 296/155; 296/146.1
(58) Field of Classification Search ............... 296/146.1, 296/155; 49/208
See application file for complete search history.

(56) References Cited

U.S. PATENT DOCUMENTS

| | | | |
|---|---|---|---|
| 4,502,246 A | 3/1985 | Minami | |
| 4,862,640 A * | 9/1989 | Boyko et al. | 49/213 |
| 5,069,000 A * | 12/1991 | Zuckerman | 49/28 |
| 5,906,071 A * | 5/1999 | Buchanan, Jr. | 49/360 |
| 5,967,595 A | 10/1999 | Heya et al. | |
| 5,979,114 A * | 11/1999 | Clark et al. | 49/360 |
| 6,079,767 A * | 6/2000 | Faubert et al. | 296/155 |
| 6,178,699 B1 * | 1/2001 | Kawanobe et al. | 49/360 |
| 6,256,930 B1 * | 7/2001 | Faubert et al. | 49/362 |
| 6,276,743 B1 * | 8/2001 | Jyawook et al. | 296/155 |
| 6,382,705 B1 * | 5/2002 | Lang et al. | 296/146.12 |
| 6,430,875 B1 * | 8/2002 | Clark et al. | 49/360 |
| 6,435,600 B1 * | 8/2002 | Long et al. | 296/155 |
| 6,588,829 B2 * | 7/2003 | Long et al. | 296/155 |
| 7,100,325 B2 | 9/2006 | Ichinose | |
| 7,654,608 B2 | 2/2010 | Krajenke et al. | |
| 2008/0100091 A1 | 5/2008 | Kunishima et al. | |
| 2010/0078961 A1 | 4/2010 | Takaya et al. | |

FOREIGN PATENT DOCUMENTS

JP    2006-219959    8/2006

\* cited by examiner

*Primary Examiner* — Lori Lyjak
(74) *Attorney, Agent, or Firm* — Rankin, Hill & Clark LLP

(57) ABSTRACT

A vehicle closure assembly includes a vehicle body defining an opening, a latch assembly mounted to the vehicle body, a track mounted to the vehicle body, a slidable closure movable with respect to the vehicle body for selectively covering the opening, and a roller and striker assembly connected with the slidable closure for movement with the slidable closure. The roller and striker assembly includes a roller riding on the track and a striker for cooperating with the latch assembly. The roller moves with respect to the track to allow the slidable closure to move with respect to the vehicle body. The striker engages with the latch assembly to preclude movement of the slidable closure with respect to the vehicle body.

20 Claims, 4 Drawing Sheets

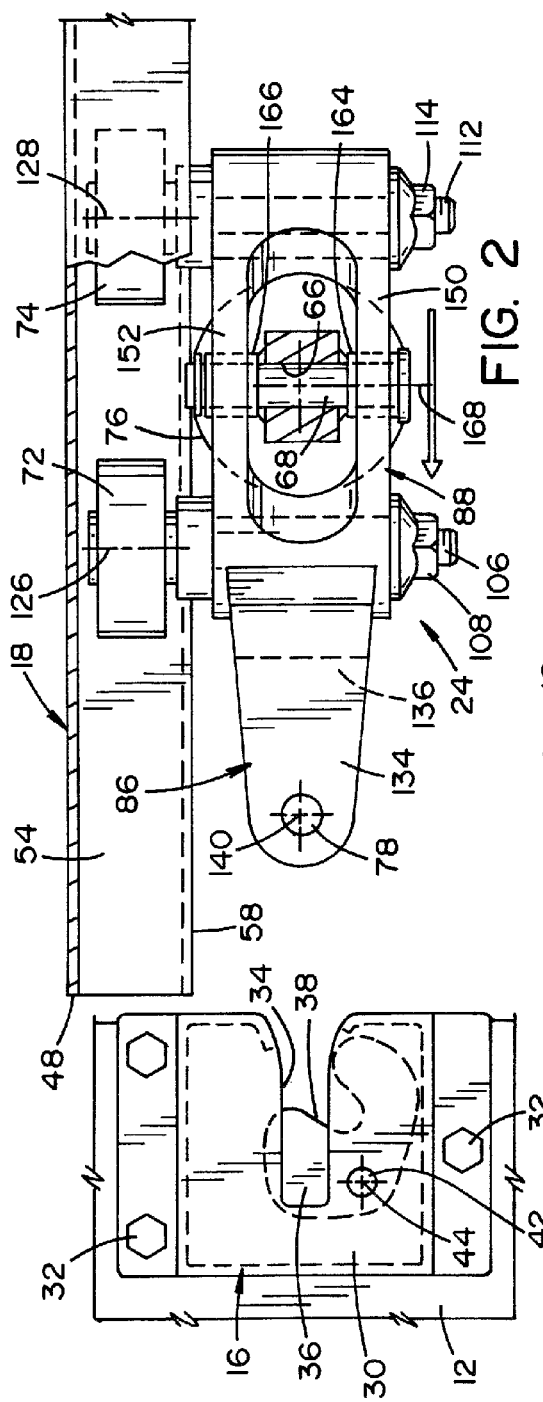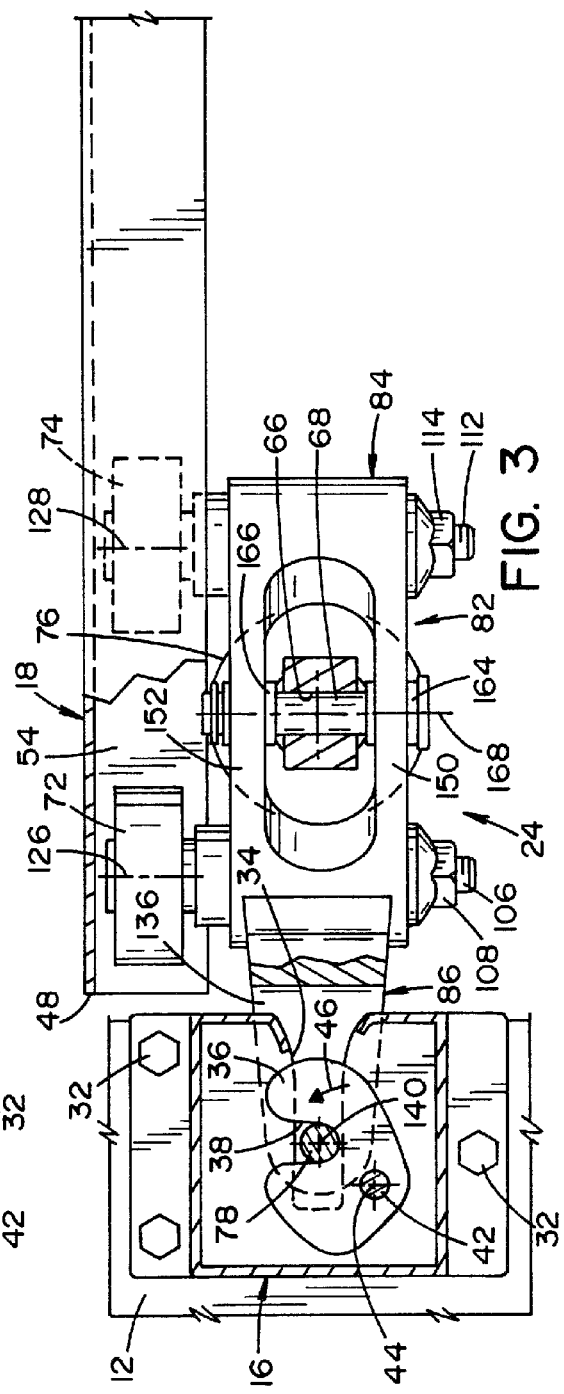

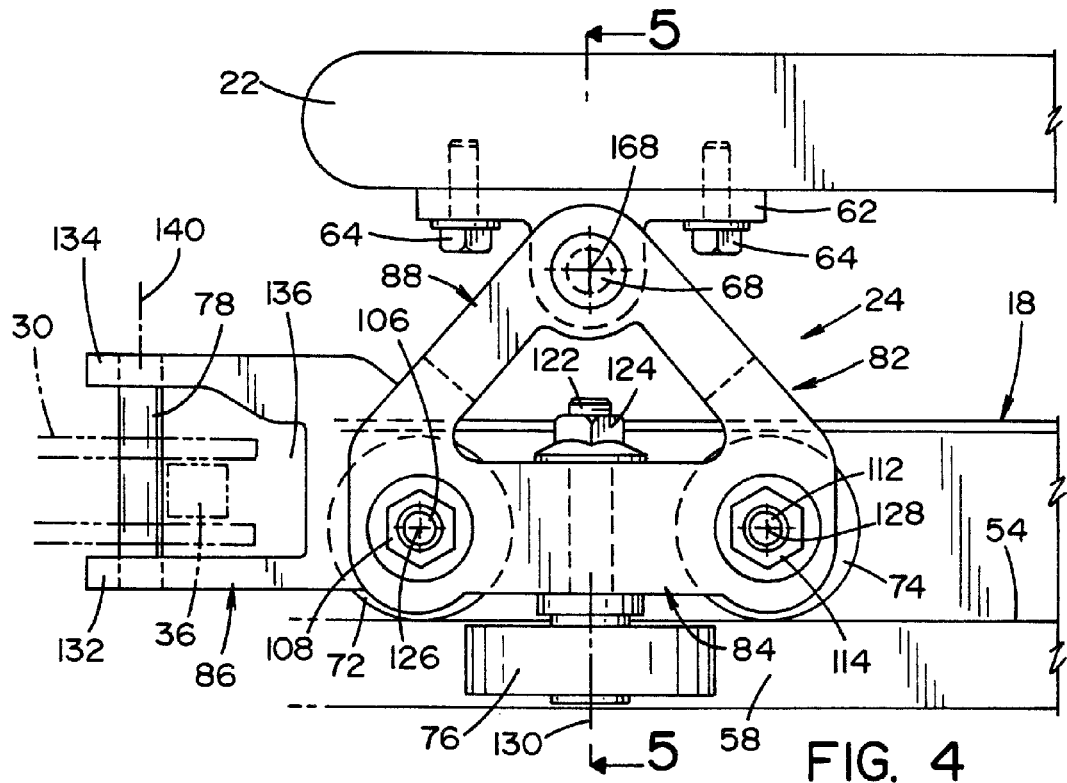
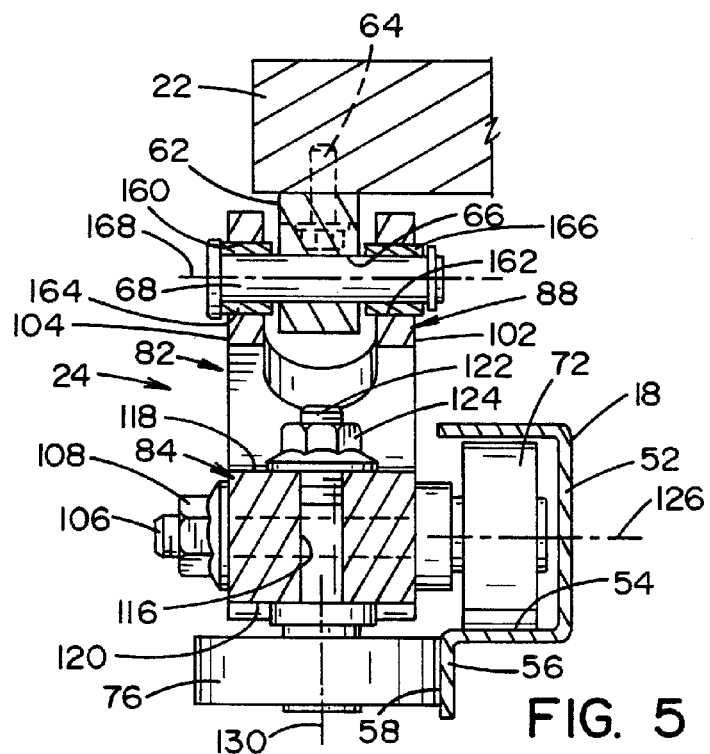

INTEGRATED ROLLER AND STRIKER ASSEMBLY FOR A VEHICLE

BACKGROUND

Vehicles equipped with slide doors typically include a roller assembly having two or three guide rollers mounted to a frame. The frame connects with the slide door and pivots relative to a door panel of the slide door. Traditional vehicles use a latch that hooks around a striker to fix the slide door in a specified position. The latch is normally mounted to the door and the striker to the vehicle body; however, these can be reversed depending on the layout.

Three of the functional components of the slide door, the roller assembly, the latch and the striker, are often spaced relatively far from one another, which typically is not a problem where space is not an issue. Oftentimes, the space required for the functional components, i.e. latch, rollers, striker, hinges, etc., is at a premium, and therefore finding enough space for the appropriate location of each of the functional components can present difficulties.

SUMMARY

An example of a vehicle closure assembly that may overcome at least one of the aforementioned shortcomings includes a vehicle body defining an opening, a latch assembly mounted to the vehicle body, a track mounted to the vehicle body, a slidable closure movable with respect to the vehicle body for selectively covering the opening, and a roller and striker assembly connected with the slidable closure for movement with the slidable closure. The roller and striker assembly includes a roller riding on the track and a striker for cooperating with the latch assembly. The roller moves with respect to the track to allow the slidable closure to move with respect to the vehicle body. The striker, which is connected with the roller, engages with the latch assembly to fix the slidable closure in a specified position with respect to the vehicle body.

An example of a vehicle roller and striker assembly that may overcome at least one of the aforementioned shortcomings includes a frame, a roller rotatably connected with the frame, and a striker connected with the frame. The frame is configured to connect with a slidable closure of a vehicle for movement with the slidable closure as the slidable closure moves with respect to a vehicle body of the vehicle. The striker is configured to cooperate with a latch on the vehicle to fix the roller and striker assembly with respect to the vehicle body.

BRIEF DESCRIPTION OF THE DRAWINGS

FIG. 2 is a cross-sectional view taken along line 2-2 of FIG. 1.

FIG. 3 is a cross-sectional view similar to FIG. 2 showing the roller and striker assembly engaged with a latch assembly on the vehicle.

FIG. 4 is a side elevation view depicting the roller and striker assembly engaging the latch assembly shown in FIG. 3 (the latch assembly being shown in phantom).

FIG. 5 is a cross-sectional view taken along line 5-5 in FIG. 4.

DETAILED DESCRIPTION

Figure 1:
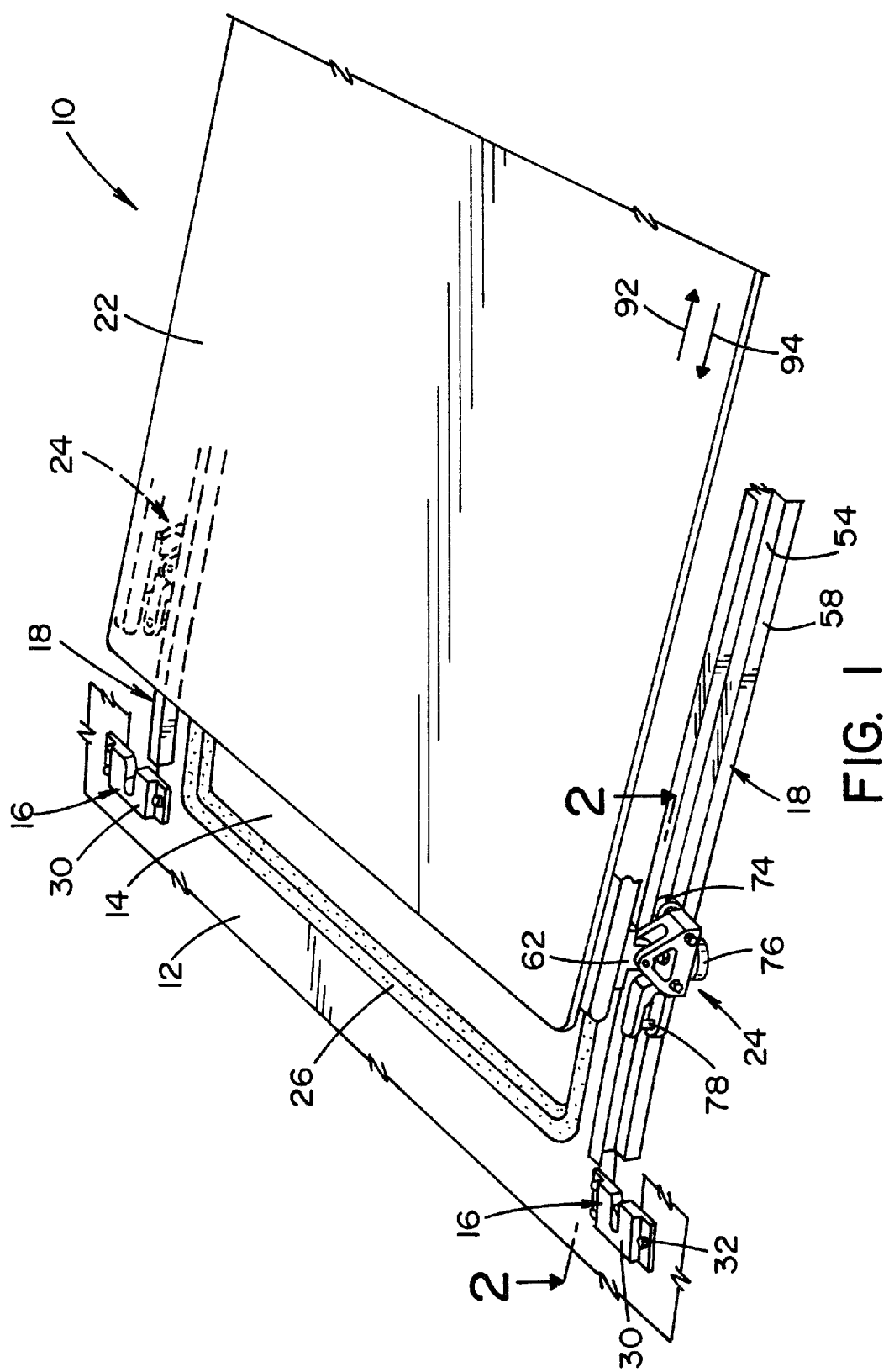
FIG. 1 is a perspective view of a vehicle closure assembly including a slidable closure and an integrated roller and striker assembly.

FIG. 1 depicts a vehicle closure assembly 10 including a vehicle body 12 (only a portion of which is shown) defining an opening 14. A latch assembly 16, two of which are shown in FIG. 1, mounts to the vehicle body 12. In the embodiment illustrated in FIG. 1, the two latch assemblies 16 are identical, therefore, only one latch assembly will be described with particularity. A track 18, two of which are shown, mounts to the vehicle body 12. The tracks 18 shown in FIG. 1 are also identical. The vehicle closure assembly 10 further includes a slidable closure 22, which is movable with respect to the vehicle body 12 for selectively covering the opening 14. A roller and striker assembly 24 connects with the slidable closure 22 for movement with the slidable closure. The roller and striker assembly 24 cooperates with the latch assembly 16 to fix the slidable closure 22 in a specified position, which for the embodiment depicted in FIG. 1 is a closed position where the slidable closure 22 completely covers the opening 14.

The portion of the vehicle body 12 depicted in FIG. 1 is a roof panel and the opening 14 is formed in the roof panel. The slidable closure 22 depicted in FIG. 1 is a movable roof panel, e.g. similar to a sunroof. Nevertheless, the roller and striker assembly 24 can connect with other movable closures, e.g. a sliding door, to cover ingress/egress openings into the vehicle, similar to a typical van or minivan. With reference back to FIG. 1, a seal 26 mounts to the vehicle body 12 and surrounds the opening 14. The movable closure 22, when in the closed position, seals against the seal 26 to prevent the ingress of water and moisture into the internal cabin of the vehicle.

With reference to FIG. 2, the latch assembly 16 includes a housing 30 mounted to the vehicle body 12 via fasteners 32. The housing 30 includes a slot 34 that opens on a side of the housing 30 adjacent the roller and striker assembly 24. The latch assembly 16 further includes a latch 36, which is generally hook-shaped, also defining a slot 38. An axle 42 connects the latch 36 with the housing 30 and/or the vehicle body 12. The axle 42 defines a pivot axis 44 about which the latch 36 pivots for cooperation with the roller and striker assembly 24. The latch 36 can be biased in a closing direction, as depicted by arrow 46 in FIG. 3, by a biasing member or spring (not shown). In the embodiment illustrated in FIG. 1, the latch assembly 16 mounts to the vehicle body 12 adjacent a forward end 48 of the track 18, which is mounted to the vehicle body 12.

With continued reference to FIG. 1, the track 18 extends along a longitudinal direction of the vehicle adjacent the opening 14. With reference to FIG. 5, the track 18 includes a backwards C-shaped section 52 (per the orientation shown in FIG. 5) that defines a first rolling surface 54. A flange 56 depends downwardly from the backwards C-shaped section 52 (per the orientation shown in FIG. 5). The flange 56 defines a second rolling surface 58.

As most clearly seen in FIG. 1, in the illustrated embodiment the slidable closure 22 is a panel and can be located on the roof of the vehicle. As discussed above, the roller and striker assembly 24 depicted in the figures is also useful with a slidable closure that operates as a sliding door. With reference to FIG. 4, a bracket 62 is affixed to the slidable closure 22 via fasteners 64. With reference to FIG. 5, the bracket 62 includes a bore 66 that receives a closure fastener 68 for connecting the roller and striker assembly 24 to the slidable closure 22. The closure fastener 68 can rotate within the bore 66 with respect to the bracket 62. With reference to FIG. 4, the roller and striker assembly 24 includes a roller (rollers 72, 74 and 76 are shown in FIG. 4) riding on the track 18 and a striker 78 for cooperating with the latch assembly 16 (FIG. 1). The rollers 72, 74 and 76 move with respect to the track 18 to allow the slidable closure 22 to move with respect to the vehicle body 12. The first and second rollers 72 and 74 roll along the first rolling surface 54, and the third roller 76 rolls along the second rolling surface 58. The striker 78 engages with the latch assembly 16 (FIG. 1) to preclude movement of the slidable closure 22 with respect to the latch assembly 16, and thus the vehicle body 12.

Figure 6:
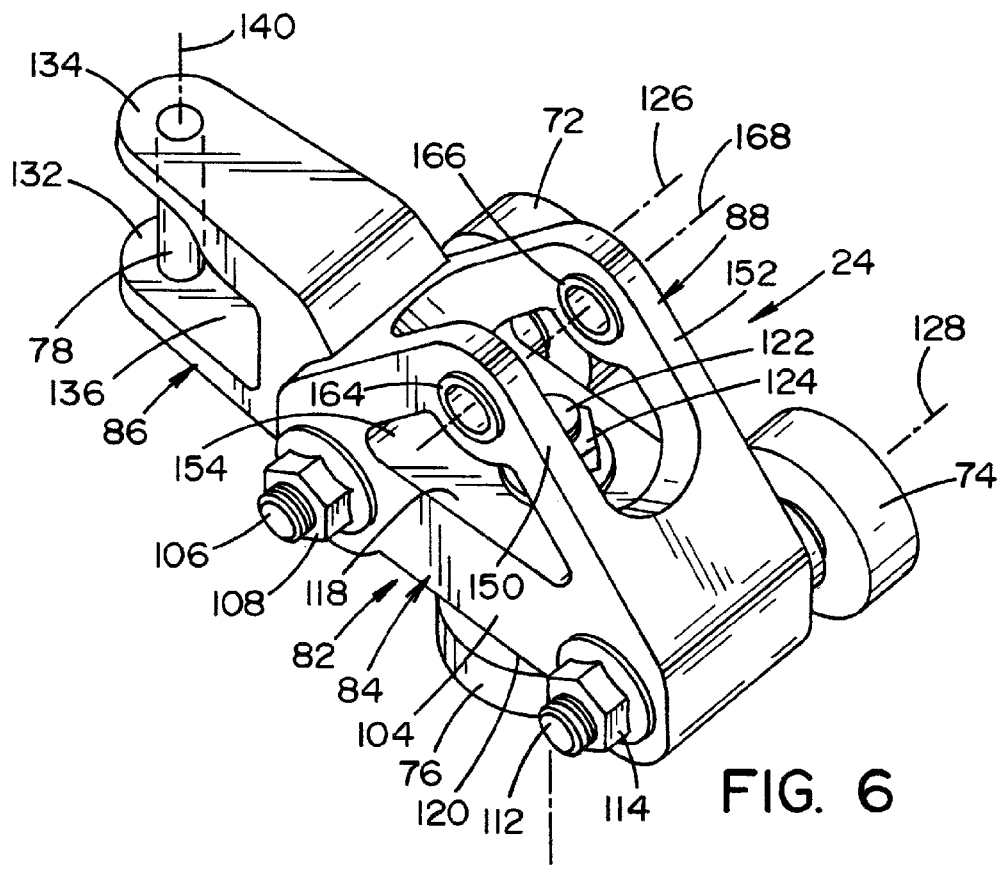
FIG. 6 is a perspective view of the roller and striker assembly.
Figure 7:
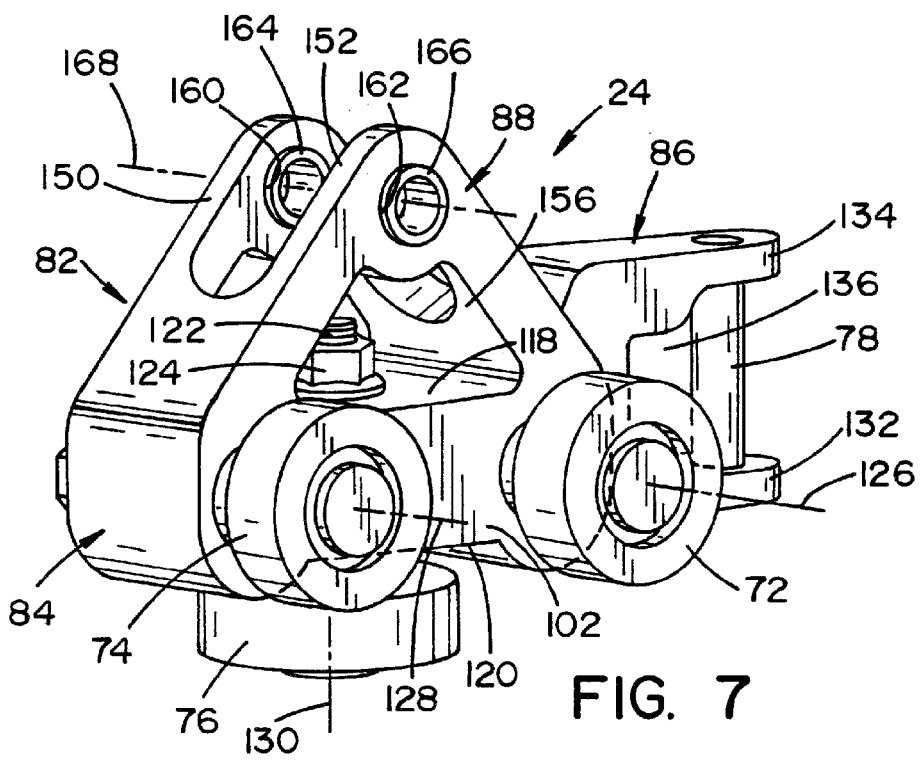
FIG. 7 is another perspective view of the roller and striker assembly.

With reference to FIGS. 6 and 7, the roller and striker assembly 24 includes a frame 82 having a roller support 84 to which the rollers 72, 74 and 76 are rotatably connected and a striker support 86 to which the striker 78 is connected. The frame 82 also includes a closure fastener support 88 extending from the roller support 84. The frame 82 is made from a rigid material, e.g. metal, in the depicted embodiment; however, other rigid materials are contemplated.

With reference back to FIG. 1, the slidable closure 22 moves with respect to the track 18 in an opening direction (arrow 92) and a closing direction (arrow 94). With reference back to FIGS. 6 and 7, the striker support 86 extends from the roller support 84 in the closing direction 94 (FIG. 1). Accordingly, when the slidable closure moves in the closing direction 94, the striker 78 can engage with the latch assembly 16. The closure fastener support 88 extends from the roller support 84 in a direction generally perpendicular to the closing direction 94 and the opening direction 92. The roller support 84, the striker support 86, and the closure fastener support 88 make up the frame 82 and are each connected to one another. As such, the rollers 72, 74, 76 and the striker 78 are connected with each other and are integrated into a single unit.

With reference back to FIG. 6, the roller support 84 in the depicted embodiment is a substantially solid body and can be made from metal or another rigid material as can the remainder of the frame. The roller support 84 has substantially planar side surfaces including a roller side 102 (FIG. 7) and a second side 104 (FIG. 6) opposite the roller side. The roller support 84 includes a first axle bore extending through the roller support from the roller side 102 to the second side 104 for receiving a first axle 106 for connecting the first roller 72 to the roller support 84. An end of the axle 106 is threaded in the illustrated embodiment and a nut 108 threads onto the axle 106 for affixing the axle 106 with respect to the roller support 84. The roller support 82 also includes a second bore extending through the roller support from the roller side 102 to the second side 104 for receiving a second axle 112 for connecting the second roller 74 to the roller support 84. The second axle 112 can include a threaded end and a nut 114 threads onto the threaded end for affixing the axle 112 with respect to the roller support 84. The roller support 82 further includes a third bore 116 (FIG. 5), which is aligned perpendicularly with respect to the first and second bores and is disposed at a midpoint therebetween. The third bore 116 extends through the roller support 82 from an upper (per the orientation shown in FIG. 5) surface 118 to a lower surface 120 and receives a third axle 122 for attaching the third roller 76 to the roller support 84. A third nut 124 threads onto a threaded end of the third axle 122 for affixing the third axle to the roller support 84.

The first roller 72 rotates about a first rotational axis 126, which is generally perpendicular to the opening direction 92 and the closing direction 94 (FIG. 1). The second roller 74 rotates about a second roller axis 128, which is also generally perpendicular to the opening direction 92 and the closing direction 94. The first roller axis 126 is generally parallel to the second roller axis 128. The third roller 76 rotates about a third roller axis 130. The third roller axis 130 is generally perpendicular to the first roller axis 126 and the second roller axis 128. The third roller axis 130 is also generally perpendicular to the opening direction 92 and the closing direction 94 (FIG. 1).

The striker support 86 extends from a forward end of the roller support 84. The striker support 86 is substantially U-shaped having two spaced legs: a first (lower) leg 132 and a second (upper) leg 134. The striker 78 extends from adjacent a distal end of one leg, i.e., the lower leg 132, to adjacent a distal end of the other leg, i.e., the upper leg 134. As most clearly seen in FIG. 4, the striker support 86 defines a gap 136 for receiving the latch 36 (shown in phantom in FIG. 4) and the lower leg 132 is spaced from the upper leg 134 a sufficient distance for receiving the latch housing 30. The striker 78 in the illustrated embodiment is substantially cylindrical and made from a hard material, such as hardened steel. The striker 78 defines a central striker axis 140. The central striker axis 140 is substantially parallel with at least one rotational axis of the rollers, for example, the third rotational axis 130. The central striker axis 140 is also substantially perpendicular with at least one rotational axis of at least one of the rollers, for example, the first rotational axis 126 and the second rotational axis 128.

With reference back to FIGS. 6 and 7, the closure fastener support 88 includes two spaced support structures 150 and 152 that are spaced from one another in a direction general parallel to the first rotational axis 126 and the second rotational axis 128. Each support structure 150, 152, respectively, has a generally inverted V-shape to define a generally trapezoidal opening 154, 156, respectively, with respect to the planar upper surface 118 of the roller support 84. The first support structure 150 includes an opening 160 adjacent a vertex of the first support structure. The second support structure 152 includes an opening 162 adjacent the vertex of the second support structure. Each opening 160, 162 receives a respective bearing 164, 166 that surrounds the closure fastener 68 (FIG. 5). The openings 160, 162 are coaxial with a central axis 168 of the closure fastener 68. The closure fastener support 88 is configured to connect with the closure fastener 68 for connecting with the slidable closure 22. The closure fastener 68 can rotate with respect to the slidable closure 22 and the bracket 62 about the axis 168, which is parallel with the first rotational axis 126 of the first roller 72 and the second rotational axis 128 of the second roller 74. The central striker axis 140 is substantially perpendicular with the closure fastener axis 168. Each of the spaced support structures 150, 152 of the closure support 88 extend from the roller support 84 in a direction substantially perpendicular to the direction in which the striker support 86 extends from the roller support 84.

The roller and striker assembly 24 provides a compact assembly that integrates the striker 78 with the rollers 72, 74 and 76. The first and second rollers 72, 74 extend from the roller side 102 of the roller support 84 and the roller support further includes the second side 104 opposite the roller side. An external surface of the first support structure 150 is substantially co-planar with (or alternatively slightly offset inwardly from) the second side 104 and an external surface of the second support structure 152 is substantially co-planar with (or alternatively slightly offset inwardly from) the roller side 102. Additionally, lateral edges of the striker support are each offset inwardly with respect to the roller side 102 and the opposite side 104 of the roller support 84, which provides a compact integrated structure. Moreover, the closure fastener support 88, which includes the first and second support structures 150 and 152, is rearwardly offset from the striker support 86, i.e., the closure fastener support 88 is spaced from the striker 78 and the striker support 86 in the opening direction 92 (FIG. 1). As such, the striker 78 can engage the latch assembly 16 without the closure fastener support 88 contacting the latch assembly 16 and getting in the way.

A vehicle closure assembly and a roller and striker assembly for use with the vehicle closure assembly have been described above with particularity. Modifications and alterations will occur to those upon reading and understanding the preceding detailed description. The invention, however, is not limited to only the embodiment described above. Instead, the invention is broadly defined by the appended claims and the equivalents thereof.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle closure assembly comprising:
a vehicle body defining an opening;
a latch assembly mounted to the vehicle body;
a track mounted to the vehicle body;
a slidable closure movable with respect to the vehicle body for selectively covering the opening; and
a roller and striker assembly connected with the slidable closure for movement with the slidable closure, the roller and striker assembly including a roller riding on the track and a striker for cooperating with the latch assembly, wherein the roller moves with respect to the track to allow the slidable closure to move with respect to the vehicle body, wherein the striker, which is connected with the roller, engages with the latch assembly to fix the slidable closure in a specified position with respect to the body.

2. The vehicle closure assembly of claim 1, wherein the slidable closure moves with respect to the track in an opening direction and a closing direction, and the roller and striker assembly includes a frame having a roller support to which the roller is rotatably connected and a striker support to which the striker is connected.

3. The vehicle closure assembly of claim 2, wherein the striker support extends from the roller support in the closing direction.

4. The vehicle closure assembly of claim 3, wherein the frame includes a closure fastener support extending from the roller support in a direction generally perpendicular to the closing direction, wherein the closure fastener support receives a fastener for connecting the roller and striker assembly with the slidable closure.

5. The vehicle closure assembly of claim 4, wherein the closure fastener support is spaced from the striker in the opening direction.

6. The vehicle closure assembly of claim 4, wherein the closure fastener support is spaced from the striker support in the opening direction.

7. The vehicle closure assembly of claim 1, wherein the striker is generally cylindrical and defines a central striker axis, which is generally perpendicular to a direction in which the slidable closure moves.

8. A vehicle roller and striker assembly comprising:
a frame configured to connect with an associated slidable closure of a vehicle for movement with the slidable closure as the slidable closure moves with respect to an associated vehicle body of the vehicle;
a roller rotatably connected with the frame; and
a striker connected with the frame, the striker being configured to cooperate with an associated latch on the associated vehicle body to fix the roller and striker assembly with respect to the associated vehicle body.

9. The assembly of claim 8, wherein the striker is substantially cylindrical.

10. The assembly of claim 9, wherein the striker defines a central striker axis and the roller includes a plurality of rollers rotatably connected with the frame, wherein the central striker axis is substantially parallel with at least one rotational axis of at least one of the rollers.

11. The assembly of claim 10, wherein the central striker axis is substantially perpendicular with at least one rotational axis of at least one of the rollers.

12. The assembly of claim 8, wherein the frame includes a roller support and a striker support, the roller being connected with the roller support and the striker being connected with the striker support, wherein the striker support extends from an end of the roller support.

13. The assembly of claim 12, wherein the striker support is substantially U-shaped having two spaced legs and the striker extends from adjacent a distal end of one leg to adjacent a distal end of the other leg.

14. The assembly of claim 12, wherein the frame includes a closure fastener support extending from the roller support, the closure fastener support being configured to connect with a closure fastener for connecting with the slidable closure.

15. The assembly of claim 14, wherein the closure fastener support includes spaced support structures each extending from the roller support in a direction substantially perpendicular to a direction in which the striker support extends from the roller support.

16. The assembly of claim 15, wherein each support structure includes an opening for receiving the closure fastener for connecting with the slidable enclosure.

17. The assembly of claim 16, wherein the closure fastener is rotatable with respect to each support structure within each opening.

18. The assembly of claim 16, wherein the striker is substantially cylindrical and defines a central striker axis and each opening is coaxial with a fastener axis, which is substantially perpendicular with the central striker axis.

19. The assembly of claim 18, wherein the roller extends from a roller side of the roller support and the roller support further includes a second side opposite the roller side, wherein an external surface of a first support structure is substantially coplanar with or offset inwardly from the second side and an external surface of the second support structure is substantially coplanar with or offset inwardly from the roller side.

20. The assembly of claim 19, wherein lateral edges of the striker support are each offset inwardly with respect to the roller side and the second side.

* * * * *